United States Patent
Yamada et al.

(10) Patent No.: US 8,849,127 B2
(45) Date of Patent: *Sep. 30, 2014

(54) VISIBLE LIGHT COMMUNICATION TRANSMITTER AND VISIBLE LIGHT COMMUNICATION SYSTEM

(75) Inventors: Masashi Yamada, Takasaki (JP); Kousuke Nakamura, Takasaki (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 148 days.

This patent is subject to a terminal disclaimer.

(21) Appl. No.: 13/528,361

(22) Filed: Jun. 20, 2012

(65) Prior Publication Data

US 2012/0257901 A1 Oct. 11, 2012

Related U.S. Application Data

(63) Continuation of application No. PCT/JP2010/072522, filed on Dec. 15, 2010.

(30) Foreign Application Priority Data

Mar. 24, 2010 (JP) ................................. 2010-068370

(51) Int. Cl.
H04B 10/00 (2013.01)
H04B 10/116 (2013.01)
H04B 10/114 (2013.01)

(52) U.S. Cl.
CPC ............ *H04B 10/116* (2013.01); *H04B 10/114* (2013.01)
USPC ......................................... 398/172; 398/189

(58) Field of Classification Search
CPC .. H04B 10/116; H04B 10/502; H04B 10/508; H04B 10/524; H04B 10/5162
USPC .......................................... 398/130, 158, 189
See application file for complete search history.

(56) References Cited

U.S. PATENT DOCUMENTS 4,486,739 A 12/1984 Franaszek et al.
5,510,919 A * 4/1996 Wedding ........................ 398/141

(Continued)

FOREIGN PATENT DOCUMENTS

JP S56-87189 7/1981
JP 04-233776 8/1992

(Continued)

OTHER PUBLICATIONS

Office Action in corresponding Japanese Application No. 2010-068370, dated Sep. 24, 2013, along with an English translation.

(Continued)

*Primary Examiner* — Dalzid Singh

(74) *Attorney, Agent, or Firm* — Edell, Shapiro & Finnan LLC

(57) ABSTRACT

Using a general-purpose cost-advantageous blue-light-excited-type white light emitting diode (LED), destruction of devices is prevented and visible light data communication is performed at a sufficient transmission rate. The blue-light-excited-type white LED is driven based on a driving current signal generated based on transmission data. While a visible light signal is outputted to a receiver, a multi-tone driving current signal is generated by a rising pulse and a falling pulse to a rising edge and a falling edge of the transmission data, respectively. Each of pulse widths of the rising pulse and the falling pulse is the same as a unit interval of the transmission data.

15 Claims, 18 Drawing Sheets

(56) References Cited

U.S. PATENT DOCUMENTS

| | | | |
|---|---|---|---|
| 7,570,246 B2* | 8/2009 | Maniam et al. | 345/102 |
| 7,689,132 B2 | 3/2010 | Chen et al. | |
| 7,986,783 B2* | 7/2011 | Ikushima et al. | 380/212 |
| 2007/0031157 A1* | 2/2007 | Yamada et al. | 398/198 |
| 2007/0046620 A1* | 3/2007 | Ugajin | 345/104 |
| 2007/0171946 A1* | 7/2007 | Hase et al. | 372/29.02 |
| 2008/0131140 A1 | 6/2008 | Shin et al. | |
| 2008/0181329 A1* | 7/2008 | Ikushima et al. | 375/286 |
| 2008/0212981 A1 | 9/2008 | Yamada et al. | |
| 2012/0230703 A1 | 9/2012 | Yamada et al. | |
| 2012/0257901 A1 | 10/2012 | Yamada et al. | |

FOREIGN PATENT DOCUMENTS

| | | |
|---|---|---|
| JP | 11346154 | 12/1999 |
| JP | 2002290335 | 10/2002 |
| JP | 2000174711 | 6/2003 |
| JP | 2003318836 | 11/2003 |
| JP | 2005116638 | 4/2005 |
| JP | 2006-040975 | 2/2006 |
| JP | 2007043592 | 2/2007 |
| JP | 2008518545 | 5/2008 |
| JP | 2009060203 | 3/2009 |
| JP | 2009527892 | 7/2009 |

OTHER PUBLICATIONS

Office Action in corresponding Korean Application No. 10-2012-7015486, dated Jul. 17, 2013, along with an English translation.

International Search Report in counterpart International Application No. PCT/JP2010/072522, mailed Jan. 25, 2011.

Office Action in corresponding Japanese Application No. 2010-068370, mailed May 7, 2013, along with an English translation.

* cited by examiner

EYE PATTERN WHEN NO ERROR OCCURS (SETTING 7 IN TABLE 1)

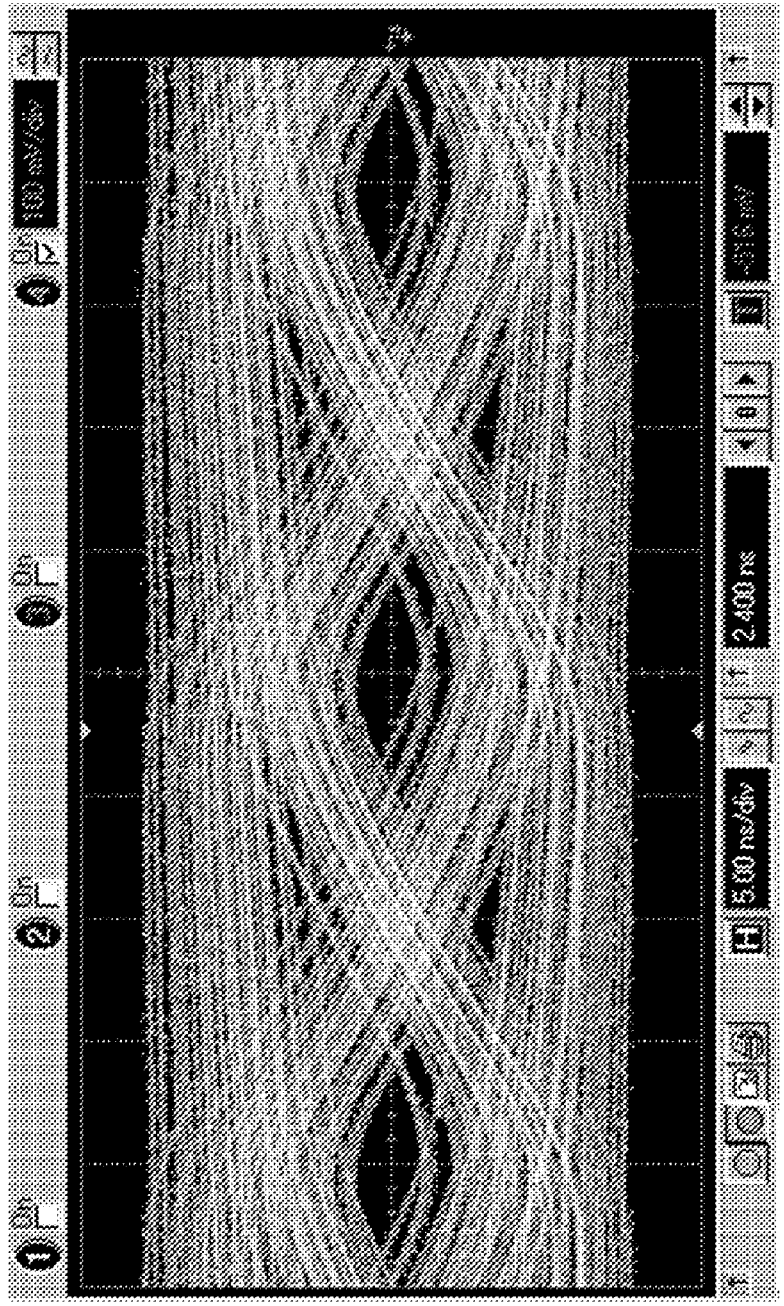

EYE PATTERN WHEN NO ERROR OCCURS (SETTING 8 IN TABLE 3)

EYE PATTERN WHEN ERROR OCCURS (SETTING 12 IN TABLE 3)

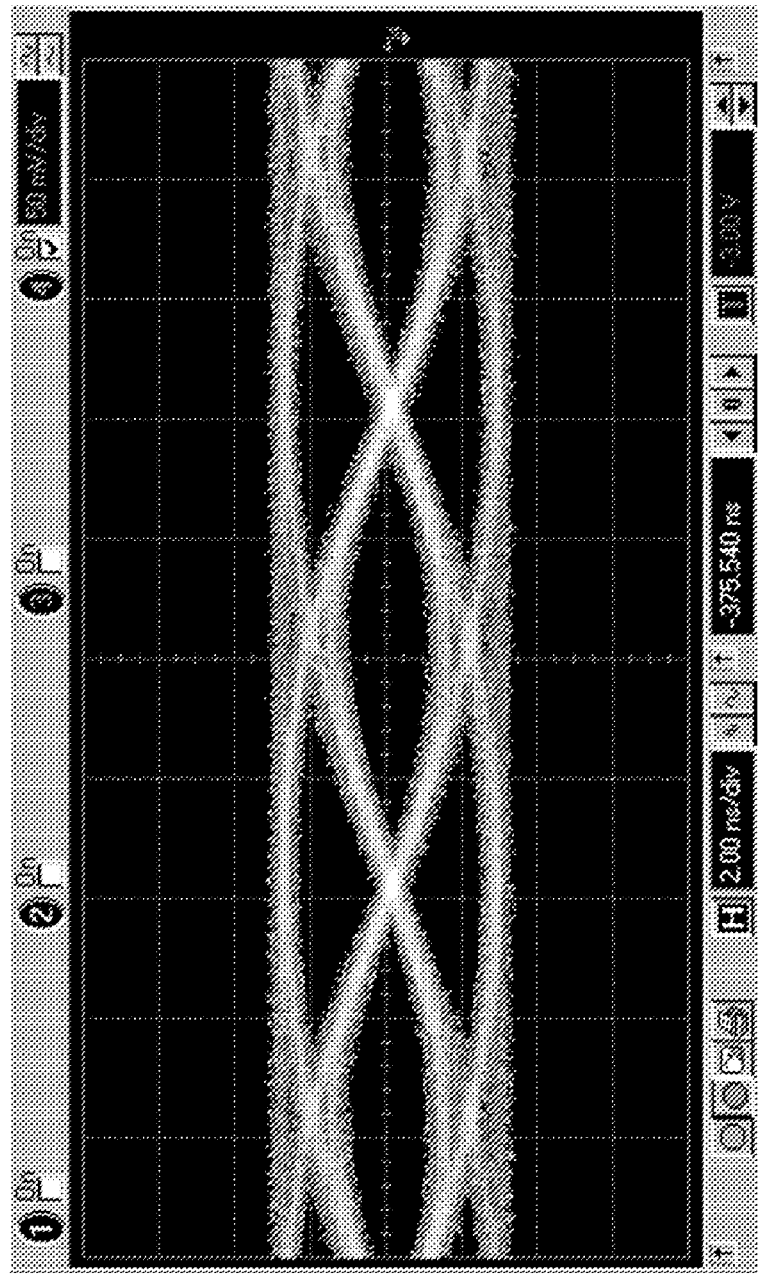

WHEN 8B10B IS USED

VISIBLE LIGHT COMMUNICATION TRANSMITTER AND VISIBLE LIGHT COMMUNICATION SYSTEM

CROSS REFERENCE TO RELATED APPLICATIONS

This application is a continuation of International Application No. PCT/JP2010/072522, filed on Dec. 15, 2010 entitled "Visible Light Communication Transmitter and Visible Light Communication System," which claims priority under 35 U.S.C. §119 to Application No. JP 2010-068370 filed on Mar. 24, 2010, entitled "Visible Light Communication Transmitter and Visible Light Communication System," the entire contents of which are hereby incorporated by reference.

FIELD OF THE INVENTION

The present invention relates to a visible light communication transmitter and a visible light communication system wherein a signal is transmitted using visible light, and more particularly, to a visible light communication transmitter and a visible light communication system wherein a white light emitting diode (referred to as "white LED" hereinafter) including luminescence of a fluorescent material is used in communication.

BACKGROUND

Recently, white LEDs are actively under developments and applications thereof includes illumination, vehicle mounted lamps and liquid crystal backlights. The white LED has a characteristic of significantly high on/off switching response speed when compared to other white light sources such as a fluorescent lamp. For this reason, a visible light communication system which enables an illumination light of the white LED to have a data transmission function, i.e., the white LED light as a data transmission medium has been proposed. That is, a transmitter of the visible light communication system modulates a luminescent intensity of the white LED according to a transmission data and the receiver converts the intensity of the light into an electric signal through a photoelectric converter such as a photo diode (referred to as a "PD" hereinafter) in order to transmit data.

For example, the white LED may be classified into three types according to luminescence schemes thereof.
(1) Blue-Light-Excited-Type White LED This LED combines a blue LED with a fluorescent material that mainly emits a yellow light. For example, an yttrium aluminum garnet (YAG) group-based fluorescent material is arranged around the blue LED, which is accommodated in a single package. In this type of LED, the surrounding fluorescent material is excited by a blue light outputted from the blue LED disposed at the center and the light (mainly yellow) that is mainly complementary to blue is outputted from the fluorescent material. By mixing yellow fluorescence from the fluorescent material and the blue light from the blue LED, a pseudo-white light is obtained.

The blue-light-excited-type white LED has the following advantages: a) it has high energy efficiency and high luminous intensity when compared to other types and b) due to a simple construction thereof, it can be manufactured at a low cost. On the other hand, it is disadvantageous in that it has poor color rendering. Color rendering refers to characteristics of color appearance of an object under illumination and the closer a color is to that perceived under natural light, the better the color rendering.
(2) Ultraviolet-Light-Excited-Type White LED This LED combines ultraviolet light with fluorescent materials that emit lights of three primary colors of red (R), green (G) and blue (B), respectively. The fluorescent materials that emit three primary colors of R, G and B are arranged around an ultraviolet LED, which is accommodated in a single package. In this type of LED, the surrounding fluorescent materials are excited by the ultraviolet light outputted from the ultraviolet LED disposed at the center and the lights of the three primary colors of R, G and B are outputted from the fluorescent materials, respectively. By mixing the R, G and B light, a white light can be obtained.

The ultraviolet-light-excited-type white LED is advantageous in that the LED has superior the color rendering. On the other hand, the LED is disadvantageous in that a) it has low energy efficiency and poor luminous intensity when compared to the blue-light-excited-type white LED, and b) a driving voltage of the LED is high due to ultraviolet luminescence.
(3) Three-Color-Emitting-Type White LED This LED combines three types of LEDs, namely R, G and B LEDs. The three types of LEDs, i.e., the red LED, the green LED and the blue LED, are accommodated in a single package. In this type of LED, a white light is obtained by simultaneously causing the LEDs to emit the three primary colors, respectively.

The three-color-emitting-type white LED is advantageous in that the LED has a superior color rendering similar to the ultraviolet-light-excited-type white LED. On the other hand, it is disadvantageous in the white LED requires high manufacturing cost due to the three types of LEDs accommodated in a single package when compared to other types of LEDs.

A conventional optical communication apparatus employing a white LED is illustrated in FIG. 13A. In the optical communication apparatus shown in FIG. 13A, when transmission data is provided to a driver 902 of a transmitter 900, the corresponding driving current is outputted to a white LED 904 and the white LED 904 emits light. For example, the white LED 904 blinks when modulated by OOK (on-off keying) for example. A light signal outputted from the white LED 904 is incident on a PD 912 of a receiver 910. The light signal is converted into a current signal by the PD 912 and the current signal is converted into a voltage signal by a transimpedance amplifier (current-voltage conversion amplifier) 914. The voltage signal is subjected to desired equalization processing by an equalizer 916 and then is binarized by a limiting amplifier 918 to be outputted as received data.

When the blue-light-excited-type white LED is employed as the white LED 904, the response speed of the light outputted from the fluorescent material is low and thus only a transmission speed of about several Mbps at most can be obtained. In order to overcome the drawback, a method wherein an LED light transmission color filter, through which only the blue light passes, is installed in front of a photoelectric converter to remove an optical component having a low response speed which is outputted from the fluorescent material has been proposed to achieve a high speed. FIG. 13B shows a configuration of such device wherein a blue color filter 922 is arranged on a light-incident side of the PD 912 of the receiver 920. Through the blue color filter 922, the light in the optical signal emitted from the fluorescent material having the low response speed is removed. As a result, only the light of the blue LED is incident on the PD 912 thereby achieving, data transmission faster than that of the above-described configuration. However, even using this method, only a transmission speed of about tens of Mbps can be obtained at most.

In addition, similar to the blue-light-excited-type white LED, a transmission speed is only several Mbps when the ultraviolet-light-excited-type white LED employed as the white LED 904. Further, the driving voltage of the LED is increased resulting in difficulty in designing a driving circuit. A method of obtaining an increase in the response speed of the light emitted from the fluorescent material through improvement of the fluorescent material is in research. However, problems that a desired luminous intensity is not obtained and a high cost of the fluorescent material itself is increased have not yet been solved.

In addition, when the above-described three-color-emitting-type white LED is employed as the white LED 904, there is no fluorescent component compared to other LEDs and it is possible to transmit data by performing wavelength multiplexing whereby the respective LEDs carry different signals to achieve high speed transmission. However, since a plurality of LEDs are used, the cost increases.

As described, high-speed transmission can be expected from a general-purpose cost-advantageous blue-light-excited-type white LED. As an improvement from this viewpoint, the optical communication system illustrated in FIG. 13C includes a transmitter 930 with a peaking circuit 932. The transmitter 930 generates and adjusts driving current waveforms to obtain an optimum driving current waveform suitable for high-speed modulation. Accordingly, the transmitter 930 may output an optical signal suitable for high speed transmission even in sunlight and under a fluorescent lamp.

However, since an analog peaking circuit is used, overcurrent that exceeds a rated current of the LED may flow thereby damaging the LED. Further, since passive components such as resistors and condensers are used, it is difficult to perform adjustments for obtaining optimum driving conditions.

SUMMARY

It is an object of the present invention to perform visible light data communication at a sufficient transmission speed while preventing damage to devices while using a blue-light-excited-type white LED. It is another object of the present invention to perform visible light data communication at a sufficient transmission speed without using a blue color filter on a receiving side.

To achieve the above-mentioned objects, there is provided a visible light communication transmitter outputting a visible light signal from a blue-light-excited-type white LED driven by a driving current signal generated based on a transmission data to a receiver, the transmitter including: a multi-tone driving means configured to generate the driving current signal of multiple tones by adding a rising pulse and a falling pulse to a rising edge and a falling edge of the transmission data, respectively, wherein each of pulse widths of the rising pulse and the falling pulse is same as a unit interval of the transmission data.

According to one aspect of the present invention, when no color filter is installed on a receiving side, a ratio of a current of a data pulse corresponding to the transmission data to a current of the rising pulse and a ratio of the current of the data pulse to a current of the falling pulse may be 4/5 or less. In addition, according to one aspect of the present invention, a ratio of the current of the falling pulse to that of the rising pulse may be 1.9±0.2. In addition, according to one aspect of the present invention, when a color filter is installed in the receiver, the ratio of the current of the data pulse corresponding to the transmission data to the current of the rising pulse and the ratio of the current of the data pulse to the current of the falling pulse may be 5 or less.

According to one aspect of the present invention, there is provided a visible light communication system including a visible light communication transmitter according to an embodiment of the present invention and a visible light communication receiver configured to receive a visible light signal of multiple tones outputted from the visible light communication transmitter. The visible light communication receiver is configured to convert the visible light signal of multiple tones received from the visible light communication transmitter into an electric signal to output a received data. In a visible light communication system according to one aspect of the present invention, the visible light communication transmitter further includes a modulation encoder, and the visible light communication receiver includes a modulation decoder decoding a modulation code modulated by the modulation encoder. The visible light communication transmitter and the visible light communication receiver uses 8B10B as a modulation method. In a visible light communication system according to one aspect of the present invention, the visible light communication transmitter and the visible light communication receiver transmit and receive direct-current (DC)-free run-length limited (RLL) encoded and non-return-to-zero inverted (NRZI)-modulated data with an encoding rate of 2/3 and a minimum run of 1. The above and other purposes, features and advantages of the present invention will become apparent from the following detailed description and accompanying drawings.

According to embodiments of the present invention, since a white LED is driven by a multi-tone driving current signal to which respective pulses are added when transmission data rises and falls, respectively, it is possible to perform visible light data communication with an easily-controllable system configuration at a sufficient transmission speed while preventing destruction of the devices without using a blue color filter. In addition, since the pulse width of the rising pulse and the falling pulse is made the same as the unit interval of the transmission data, a data clock can be used as a clock required to generate a multi-tone driving signal and high-speed transmission can be achieved without adding a circuit required to generate a switch signal and the like.

BRIEF DESCRIPTION OF THE DRAWINGS

FIGS. 5A and 5B are graphs exemplifying an eye pattern according to the first embodiment of the present invention wherein FIG. 5A exemplifies an error-free eye pattern and FIG. 5B exemplifies an eye pattern during error occurrence.

FIGS. 10A and 10B are graphs exemplifying an eye pattern according to the third embodiment of the present invention wherein FIG. 10A exemplifies an eye pattern in the case of a modulation code of 8B10B and FIG. 10B exemplifies an eye pattern in the case of a modulation code of 17PP.

DETAILED DESCRIPTION

Hereinafter, best modes for implementing the present invention will be described in detail on the basis of embodiments.

First Embodiment

Figure 1A:
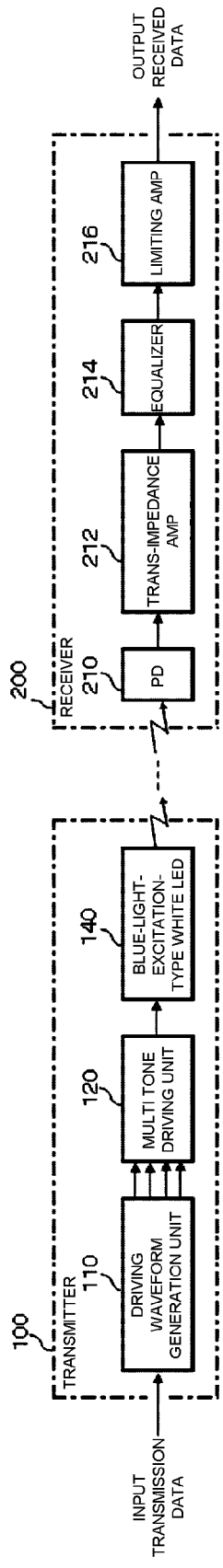
FIGS. 1A and 1B are circuit block diagrams depicting a configuration of an apparatus according to a first embodiment of the present invention.

First, a first embodiment of the present invention will be described with reference to FIGS. 1A and 1B. FIG. 1A depicts a circuit configuration of the first embodiment. In FIG. 1A, transmission data to be transmitted is inputted to a driving waveform generator 110 of a transmitter 100. An output side of the driving waveform generator 110 is connected to a blue-light-excited-type white LED 140 via a multi-tone driver 120. A white LED, for example, having a peak wavelength ranging from 440 to 470 nm as shown in FIG. 2 can be used a the blue-light-excited-type white LED 140.

A receiving side is configured similar to the conventional art described above. For example, an optical signal outputted from the transmitter 100 is incident on a PD 210 of a receiver 200 including of a general-purpose Si-PIN photodiode and the like. An electric signal output side of the PD 210 is connected to an input side of a limiting amplifier 216 that performs binarization through a trans-impedance amplifier 212 that converts a current signal into a voltage signal and an equalizer 214 that performs equalization of the voltage signal. The limiting amplifier 216 outputs a received data. In accordance with the embodiment, OOK (on-off-keying) of a baseband method is used as a transmission scheme (modulation scheme) and a transmission speed ranges from 50 to 125 Mbps.

Figure 3:
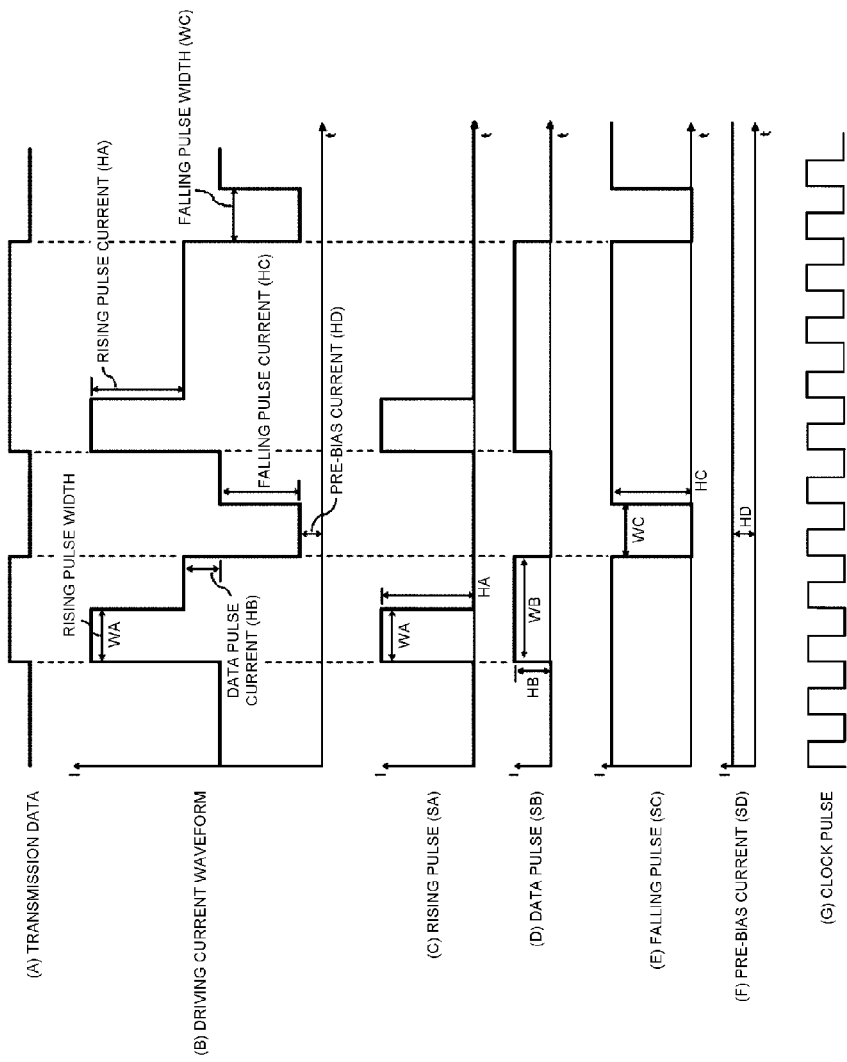
FIG. 3 is a timing diagram showing signal waveforms of main portions according to the first embodiment of the present invention.

The circuit including the driving waveform generator 110 and the multi-tone driver 120 of the transmitter 100 among the above-described components generates driving current waveform shown in (B) of FIG. 3 from a transmission data signal exemplified in (A) of FIG. 3. That is, driving current having the waveform shown in (B) of FIG. 3 is obtained through synthesis of signals shown in (C) through (F) of FIG. 3. (G) of FIG. 3 depicts a clock pulse.

More specifically, the driving waveform generator 110 comprises, for example, digital circuits such as a PLL (not shown) that generates a clock synchronized with a transmission data pulse, a rising and falling pulse edge detector (not shown) and a D flip-flop (not shown) and generates multi-tone waveforms having several values (here, four values) shown in (C) through (F) of FIG. 3 on the basis of the transmission data of (A) of FIG. 3.

Figure 1B:
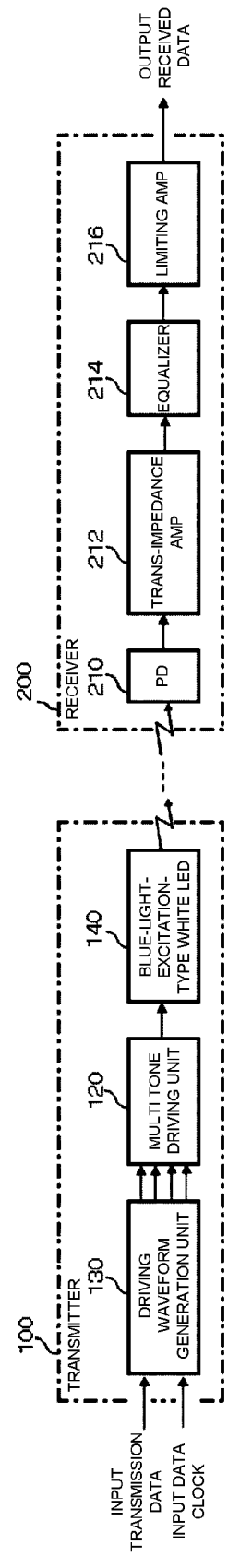
Figure 2:
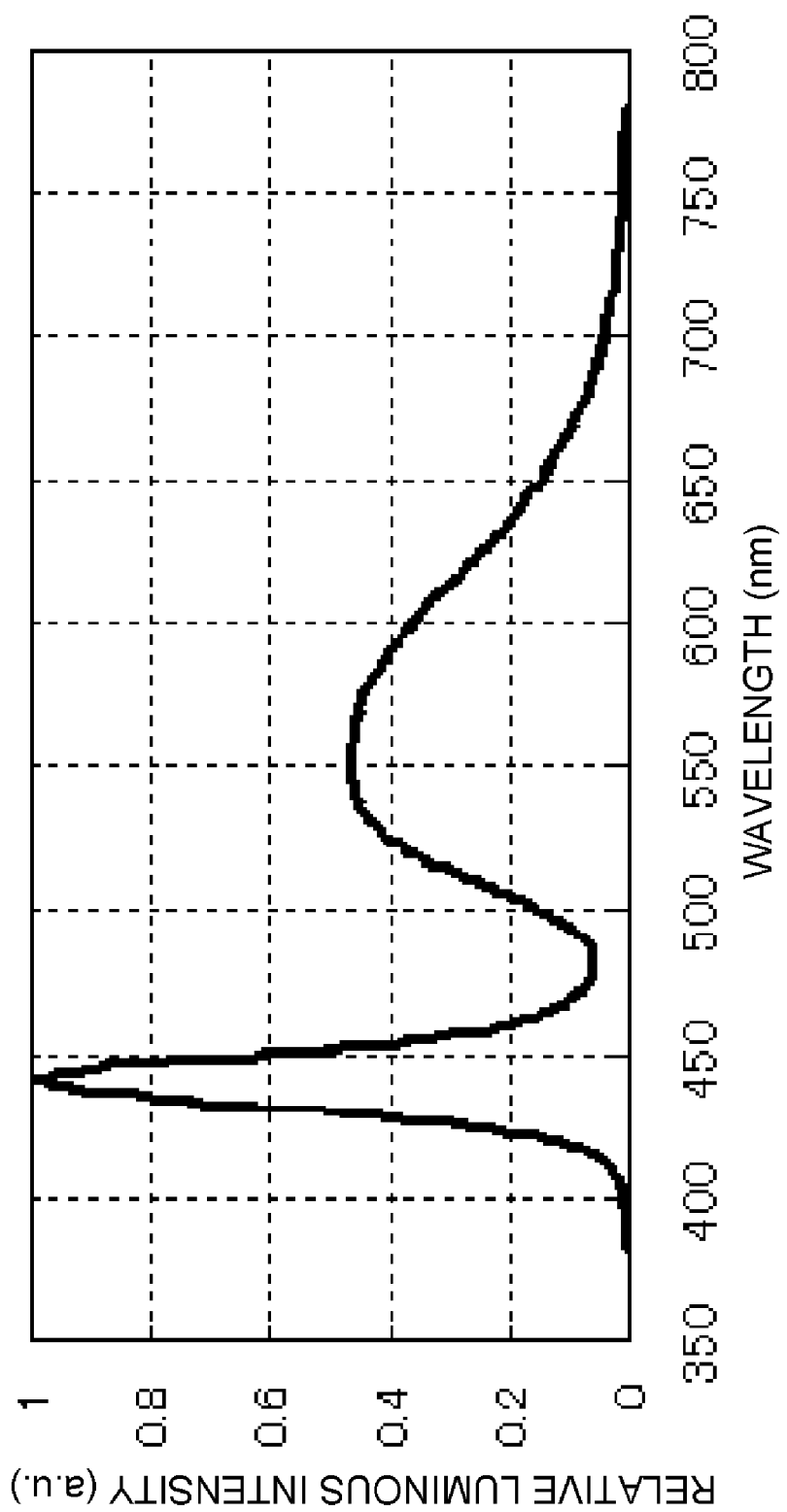
FIG. 2 is a graph exemplifying an emission spectrum of a blue-light-excited-type white LED according to the first embodiment of the present invention.

Instead of the PLL that generates the clock signal in the driving waveform generator 110, a data clock may be provided externally similar to the driving waveform generator 130 shown in FIG. 1B. The multi-tone driver 120 comprises an OR circuit and synthesizes signals of (C) through (F) of FIG. 3 outputted from the driving waveform generator 110 (or the driving waveform generator 130) to output the driving current having the waveform shown in (B) of FIG. 3.

Figure 4:
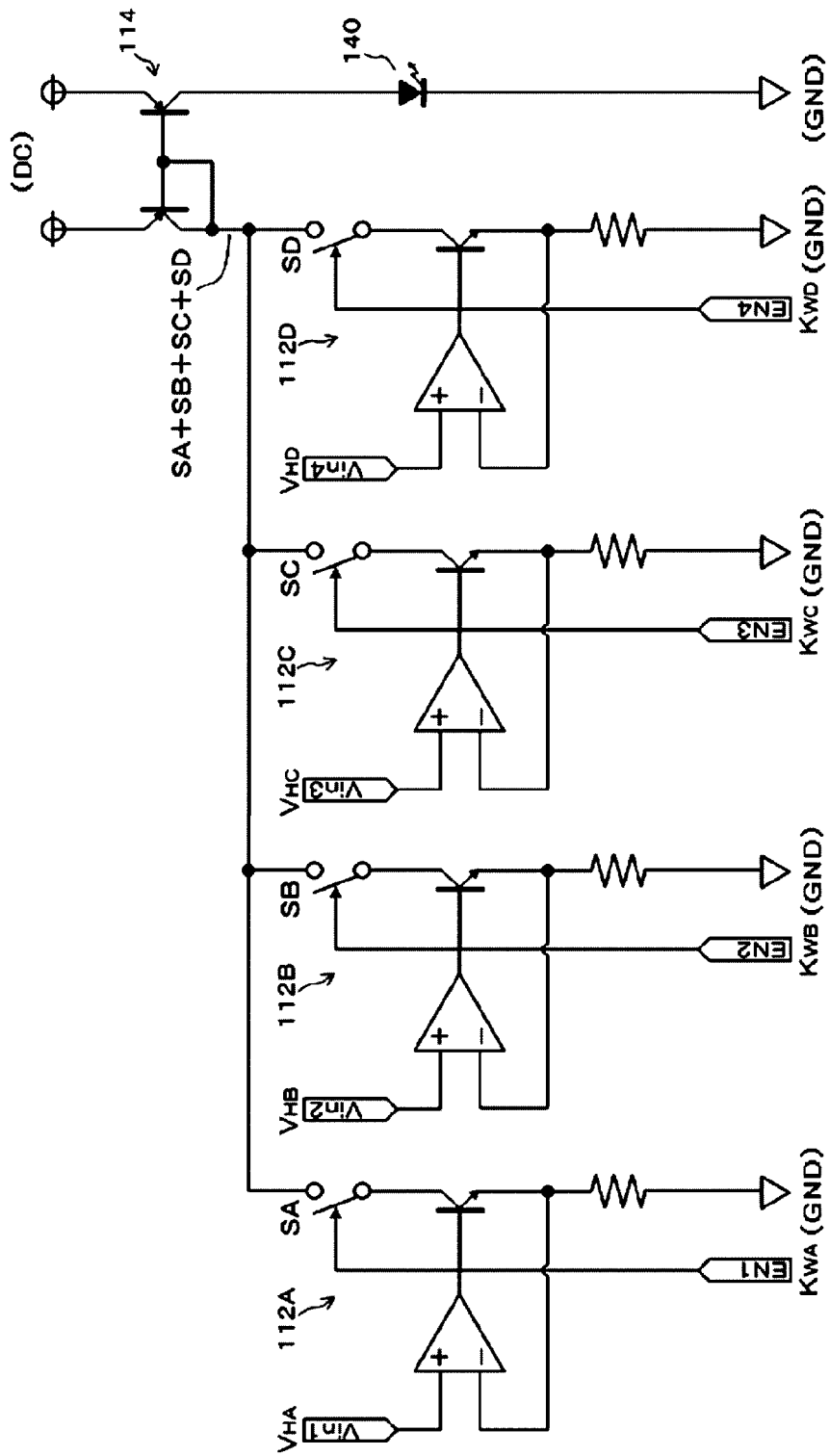
FIG. 4 is a circuit diagram exemplifying a circuit configuration of the main portions in the first embodiment of the present invention.

FIG. 4 exemplifies main portions of the driving waveform generator 110 and the multi-tone driver 120. As shown in FIG. 4, the main portions include multi-tone waveform generation circuits 112A through 112D including operational amplifiers, transistors, switches and resistors and output multi-tone signals SA through SD shown in (C) through (F) of FIG. 3, respectively. Pulse heights HA through HD of the multi-tone signals are set by voltages VHA through VHD of non-inverting inputs Vin1 through Vin4 of the operational amplifiers, respectively. Rising and falling timings are set by control signals KWA through KWD applied to control terminals EN1 through EN4 of the switches, respectively. For example, in the multi-tone waveform generation circuit 112A, the control signal KWA rises at a rising timing of the transmission data shown in (A) of FIG. 3 and falls after a predetermined time corresponding to a pulse width WA elapses. For this reason, during the time period, the switch is turned on and the voltage VHA is outputted as the multi-tone signal SA. Similarly, the multi-tone signals SB through SD are outputted from the multi-tone waveform generation circuits 112B through 112D, respectively.

The control signals KWA through KWD may be regarded as a 4-bit digital signal determined based on logic values of the transmission data. For example, the 4-bit digital signal (KWA, KWB, KWC and KWD) becomes (1, 1, 1, 1) at a time point (the rising edge) when a logic value of the transmission data of FIG. 4A is changed from L to H, becomes (0, 1, 1, 1) after the time period corresponding to the pulse width WA of the tone signal SA from the rising edge elapses, becomes (0, 0, 0, 1) at a time point (the falling edge) when the logic value of the transmission data is changed from H to L, and becomes (0, 0, 1, 1) after the time period corresponding to the pulse width WC of the tone signal SC after the falling edge elapses.

The multi-tone signals SA through SD outputted from the multi-tone waveform generation circuits 112A through 112D are added by a wired OR circuit and the added signal is applied to the blue-light-excited-type white LED 140 through a current mirror circuit 114.

Next, the multi-tone signal pulses SA through SD shown in (C) through (F) of FIG. 3 will be described. First, the pulse width WA of the rising pulse SA, which is generated at the same timing as the rising edge of the transmission data, is the same as a unit interval of the transmission data. Similarly the pulse width WC of the multi-tone signal SC, which is generated at the same timing as the rising edge of the transmission data falls, is the same as the unit interval of the transmission data.

The pulse width WB of the data pulse SB is same as that of the transmission data. The pulse height HD of the pre-bias current SD is constant regardless of the transmission data. As for a pulse height (amount of current), the sum of the heights of the pulses (HA+HB+HC+HD) is limited to a rated current of an LED to be driven, or an upper limit of the driving current of the driving circuit. In accordance with the first embodiment, when a transmission rate of 50 Mbps or more is implemented, the height HB of the data pulse SB is set as HB/HA≤4/5 and HB/HC≤4/5 with respect to the height HA of the rising pulse SA and the height HC of the falling pulse SC:. Such settings can suppress an interference between codes and lower a bit error rate.

Next, the multi-tone driver 120 is capable of current-driving the LED in nano-second order and also capable of outputting a bias voltage higher than a forward bias voltage (about 3.6 V), which is required for driving the blue light-excited white LED 140.

A generic white LED having a rated current of about 500 mA (during a pulse drive) is used as the blue light-excited white LED 140. The white LED is driven under driving-current setting conditions shown in Table 1 below.

The received optical signal is converted into a current signal by the PD 210. The current signal is converted into a voltage signal by the trans-impedance amplifier 212. The equalizer 214 equalizes the voltage signal. The limiting amplifier 216 binarizes the equalized voltage signal to obtain an output data. In accordance with the second embodiment, a receiver having a reception band for modulated light sufficient for the transmission signal and a flat frequency characteristic in a band necessary for reception is used.

The inventors of the present invention performed transmission and reception experiment using a prototype visible light communication system in accordance with embodiment. With the transmission rate set at 50 Mbps, 75 Mbps, 100

TABLE 1

|  | Setting No. 1 | Setting No. 2 | Setting No. 3 | Setting No. 4 | Setting No. 5 | Setting No. 6 | Setting No. 7 | Setting No. 8 | Setting No. 9 | Setting No. 10 | Setting No. 11 |
| --- | --- | --- | --- | --- | --- | --- | --- | --- | --- | --- | --- |
| Rising pulse current (HA) | 86.1 | 85.4 | 85.0 | 82.2 | 84.0 | 82.6 | 83.5 | 79.4 | 75.1 | 70.3 | 67.1 |
| Data pulse current (HB) | 0 | 6.5 | 9.7 | 13.9 | 20.6 | 28.9 | 38.1 | 43.3 | 57.4 | 69.5 | 77.8 |
| Falling pulse current (HC) | 85.0 | 86.6 | 85.7 | 88.3 | 87.3 | 83.3 | 80.9 | 80.9 | 80.9 | 78.6 | 73.0 |
| Pre-bias current value |  |  |  |  |  | 5.2 |  |  |  |  |  |
| HB-to-HA ratio | 0 | 0.08 | 0.11 | 0.17 | 0.25 | 0.35 | 0.46 | 0.54 | 0.76 | 0.99 | 1.16 |
| HB-to-HC ratio | 0 | 0.08 | 0.11 | 0.16 | 0.24 | 0.35 | 0.47 | 0.53 | 0.71 | 0.88 | 1.07 |
| HC-to-HA ratio | 0.99 | 1.01 | 1.01 | 1.07 | 1.04 | 1.01 | 0.97 | 1.02 | 1.08 | 1.12 | 1.09 |

All the current values are in mA.

For example, under the condition of Setting No. 4, the white LED is driven under the following conditions:
(1) Current of the rising pulse SA: 82.2 mA
(2) Current of the data pulse SB: 13.9 mA Mbps and 125 Mbps, bit error rates were measured under the settings shown in Table 1 above. The pseudo-random bit sequence (PRBS) $2^7-1$ was used as the transmission data and the amount of transmission data was $10^{10}$ bits. The measurement results are shown in Table 2 below.

TABLE 2

| Transmission rate | Setting No. 1 | Setting No. 2 | Setting No. 3 | Setting No. 4 | Setting No. 5 | Setting No. 6 | Setting No. 7 | Setting No. 8 | Setting No. 9 | Setting No. 10 | Setting No. 11 |
| --- | --- | --- | --- | --- | --- | --- | --- | --- | --- | --- | --- |
| 50 Mbps | 0 | 0 | 0 | 0 | 0 | 0 | 0 | 0 | 0 | 0 | $8 \times 10^{-3}$ |
| 75 Mbps | 0 | 0 | 0 | 0 | 0 | 0 | 0 | 0 | $5.3 \times 10^{-5}$ | No Sync | No Sync |
| 100 Mbps | 0 | 0 | 0 | 0 | 0 | 0 | $5.5 \times 10^{-8}$ | $1.6 \times 10^{-2}$ | No Sync | No Sync | No Sync |
| 125 Mbps | 0 | 0 | 0 | 0 | 0 | $9.1 \times 10^{-3}$ | $4.2 \times 10^{-2}$ | No Sync | No Sync | No Sync | No Sync |

No Sync indicates a non-synchronous state.

(3) Current of the falling pulse SC: 88.3 mA
(4) Pre-bias current: 5.2 mA

Next, an operation of the first embodiment is described below. For example, the transmission data shown in (A) of FIG. 3 is inputted to the driving waveform generator 110 of the transmitter 100. Based on the inputted transmission data, the driving waveform generator 110 and the multi-tone driver 120 generate the multi-tone driving signal shown in (B) of FIG. 3. The generated multi-tone driving signal is provided to the blue-light-excited-type white LED 140 so that the blue-light-excited-type white LED 140 is driven thereby to emit light. The optical signal outputted from the blue-light-excited-type white LED 140 is collected by a lens (not shown) or the like to be incident on the PD 210 of the receiver 200.

When the transmission rate was set to 50 Mbps, an error-free state was realized under the conditions of Setting No. 1 through Setting No. 10, and thus data could be transmitted without problem. Under the condition of Setting No. 10, a ratio of the data pulse current HB to the rising pulse current value HA (HB/HA) is 0.99 and a ratio HB/HC (HB/HC) is 0.88. In addition, under the conditions of Setting No. 1 through Setting No. 9 each ratio is 4/5 or less. For this reason, when the ratio HB/HA and the ratio of the data pulse current value HB to the falling pulse current value HC are 4/5 or less, 50-Mbps transmission is possible.

Further, according to the results in Table 2, even when the transmission rate is equal to or higher than 75 Mbps, but there is no doubt in the necessity the ratio of the data pulse current value HB to the rising pulse current value HA and the ratio of the data pulse current value HB to the falling pulse current value HC should be 4/5 or less despite differing in optimum values of driving conditions.

In accordance with one aspect of the present invention, a ratio of the falling pulse current value HC to the rising pulse current value HA (HC/HA) may be preferably set to 1.0±0.2.

Figure 5A:
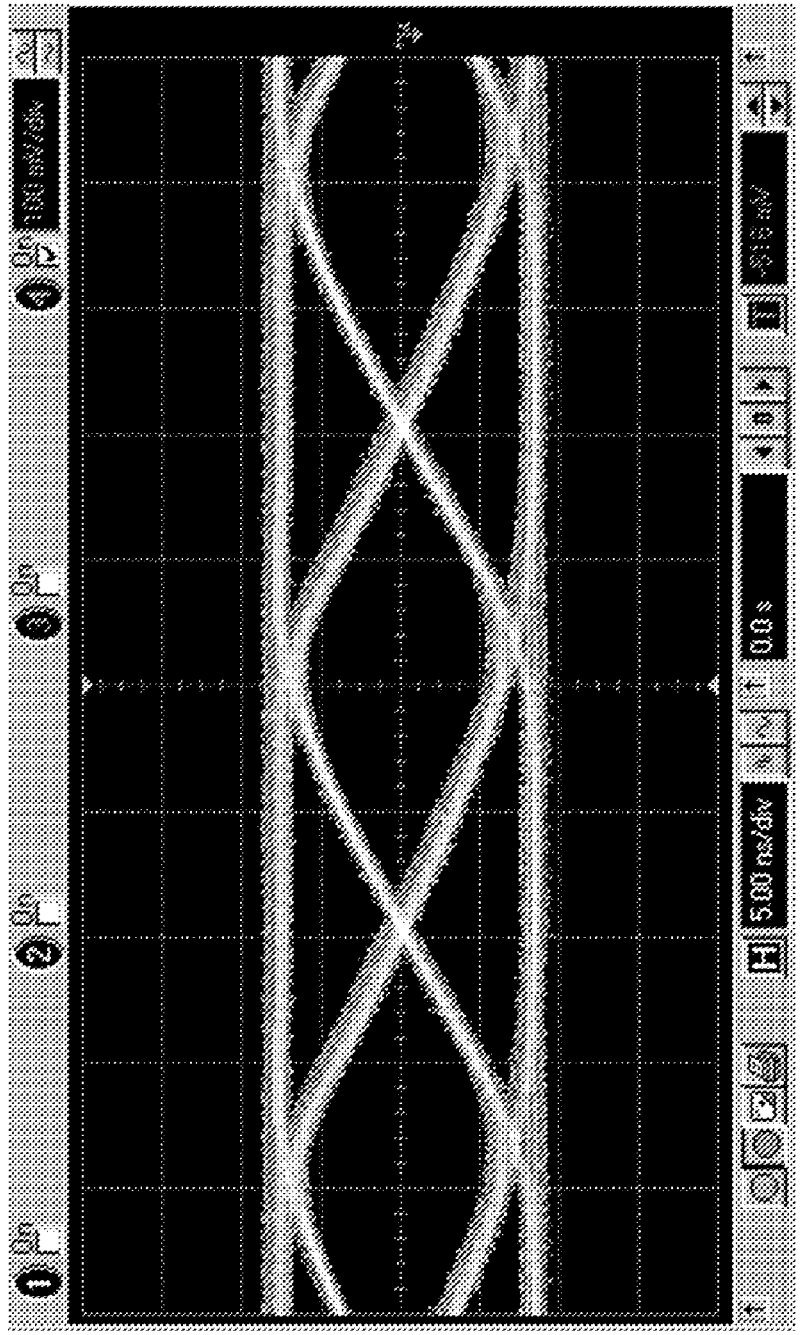

Next, under the driving conditions of Setting No. 7 through Setting No. 11, results of measuring an eye pattern during 50-Mbps transmission are shown in FIG. 5A and FIG. 5B. Under the driving condition of Setting No. 7 corresponding to the error-free state, a preferable eye pattern was obtained (see FIG. 5A). However under the driving condition of Setting No. 11 under which the bit error rate is degraded to $8.0 \times 10^{-3}$, the interference occurring between codes was observed (see FIG. 5B). Thus, it should be noted that the interference between codes is a degrading factor of bit error rates.

Second Embodiment

Next, with reference to FIG. 6 through FIG. 8B, a second embodiment of the present invention will be described. In comparison with the above-described first embodiment, a color filter is added and the LED has a different driving current condition in accordance with the second embodiment.

Figure 6:
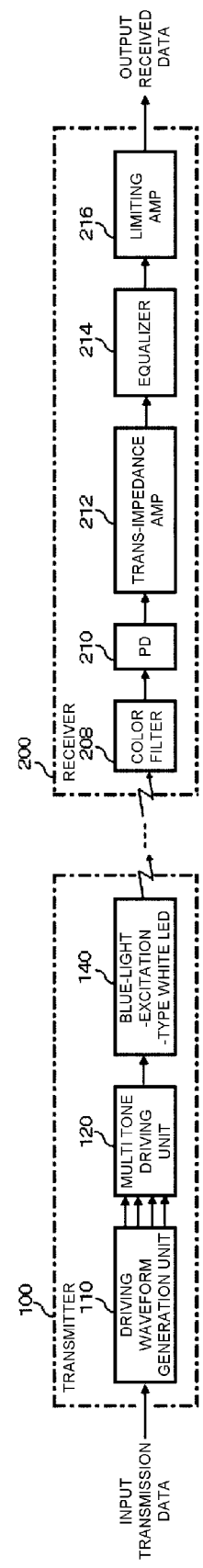
FIG. 6 is a circuit block diagram depicting a configuration of an apparatus according to a second embodiment of the present invention.
Figure 7:
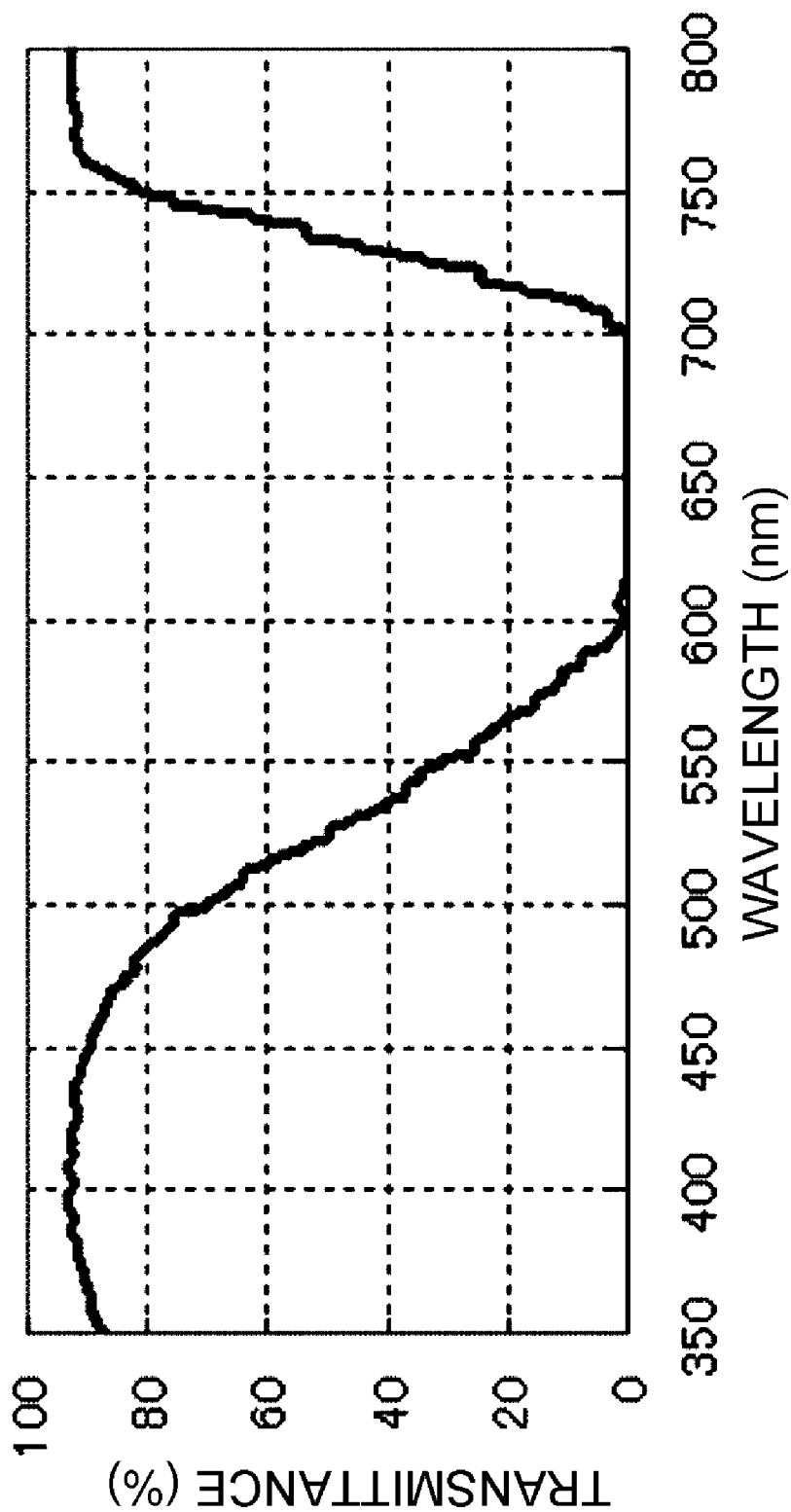
FIG. 7 is a graph exemplifying transmission characteristics of a color filter according to the second embodiment of the present invention.

FIG. 6 shows a circuit configuration of the second embodiment. A configuration of a transmitting side including a white LED is the same as that of the first embodiment except for a driving condition of the LED. Meanwhile, on a receiving side, a color filter 208 having a transmittance property shown in FIG. 7 is installed in front of the PD 210 of the first embodiment. An optical signal outputted from the transmitter 100 is incident on the PD 210 after most of light emitted from the fluorescent material is filtered out by the color filter 208. Processing after the trans-impedance amplifier 212 is the same as that of the first embodiment.

In accordance with the embodiment, a transmission scheme (modulation scheme) is OOK, which is the same as that of the first embodiment and the transmission rate is 50 through 125 Mbps. In addition, the number of tone and a pulse width of level signals generated by the driving waveform generator 110 and the multi-tone driver 120 are the same as those of the first embodiment. However, in accordance with the second embodiment, when realizing the transmission rate of 50 Mbps or higher, a ratio of the height HB of the data pulse SB to the height HA of the rising pulse SA (HB/HA) is set to satisfy HB/HA≤5, and a ratio of the height HB of the data pulse SB to the a height HC of the falling pulse SC (HB/HC) is set to satisfy HB/HC≤5. Such settings can suppress the interference between codes and lower a bit error rate.

A generic white LED having a rated current of about 500 mA (during a pulse drive) is used as the blue light-excited white LED 140. The white LED is driven under driving-current setting conditions shown in Table 3 below.

All the current values are expressed in units of mA.

For example, under the condition of Setting No. 6 in Table 3, the white LED is driven under the following conditions:

(1) Current of the rising pulse SA: 45.6 mA (2) Current of the data pulse SB: 42.7 mA (3) Current of the falling pulse SC: 67.0 mA (4) Pre-bias current value: 5.2 mA Next, an operation of the embodiment is described below. For example, the transmission data shown in (A) of FIG. 3 is inputted to the driving waveform generator 110 of the transmitter 100. Based on the inputted transmission data, the driving waveform generator 110 and the multi-tone driver 120 generate the multi-tone driving signal shown in (B) of FIG. 3. The generated multi-tone driving signal is provided to the blue-light-excited-type white LED 140 so that the blue-light-excited-type white LED 140 is driven thereby to emit light. The optical signal outputted from the blue-light-excited-type white LED 140 is incident on the color filter 208 of the receiver 200. Thus, most of light outputted from a fluorescent material among the light outputted from the blue-light-excited-type white LED 140 is filtered out. The light passing through the color filter 208 is collected by a lens (not shown) or the like to be incident on the PD 210. The incident optical signal is converted into a current signal by the PD 210. The current signal is converted into a voltage signal by the trans-impedance amplifier 212. The equalizer 214 equalizes the voltage signal. The limiting amplifier 216 binarizes the equalized voltage signal to obtain an output data. In accordance with the second embodiment, a receiver having a reception band for modulated light sufficient for the transmission signal and a flat frequency characteristic in a band necessary for reception is used.

The inventors of the present invention performed transmission and reception experiment using a prototype visible light communication system in accordance with embodiment. With the transmission rate set at 50 Mbps, 75 Mbps, 100 Mbps and 125 Mbps, bit error rates were measured under the settings shown in Table 3 above. The PRBS $2^7-1$ was used as the transmission data and the amount of transmission data was $10^{10}$ bits. The measurement results are shown in Table 4 below.

TABLE 3

| | Setting No. 1 | Setting No. 2 | Setting No. 3 | Setting No. 4 | Setting No. 5 | Setting No. 6 | Setting No. 7 | Setting No. 8 | Setting No. 9 | Setting No. 10 | Setting No. 11 | Setting No. 12 |
|---|---|---|---|---|---|---|---|---|---|---|---|---|
| Rising pulse current (HA) | 66.3 | 64.5 | 61.8 | 57.8 | 54.8 | 45.6 | 43.5 | 39.3 | 35.3 | 24.1 | 20.8 | 11.7 |
| Data pulse current (HB) | 0 | 9.0 | 16.9 | 20.7 | 27.2 | 42.7 | 57.7 | 72.9 | 92.8 | 100.0 | 109.6 | 121.1 |
| Falling pulse current (HC) | 71.3 | 64.9 | 67.9 | 66.7 | 69.5 | 67.0 | 63.3 | 62.7 | 50.3 | 39.4 | 26.0 | 15.6 |
| Pre-bias current value | | | | | | 5.2 | | | | | | |
| HB-to-HA ratio | 0 | 0.14 | 0.27 | 0.36 | 0.50 | 0.94 | 1.33 | 1.85 | 2.63 | 4.15 | 5.27 | 10.32 |
| HB-to-HC ratio | 0 | 0.14 | 0.25 | 0.31 | 0.39 | 0.64 | 0.91 | 1.16 | 1.84 | 2.54 | 4.21 | 7.78 |

TABLE 4

| Transmission rate | Setting No. 1 | Setting No. 2 | Setting No. 3 | Setting No. 4 | Setting No. 5 | Setting No. 6 | Setting No. 7 | Setting No. 8 | Setting No. 9 | Setting No. 10 | Setting No. 11 | Setting No. 12 |
|---|---|---|---|---|---|---|---|---|---|---|---|---|
| 50 Mbps | $2.0 \times 10^{-3}$ | 0 | 0 | 0 | 0 | 0 | 0 | 0 | 0 | 0 | 0 | $6.3 \times 10^{-7}$ |
| 75 Mbps | $3.0 \times 10^{-10}$ | 0 | 0 | 0 | 0 | 0 | 0 | 0 | 0 | $2.6 \times 10^{-2}$ | No Sync | No Sync |
| 100 Mbps | $8.3 \times 10^{-8}$ | 0 | 0 | 0 | 0 | 0 | 0 | 0 | $2.5 \times 10^{-2}$ | No Sync | No Sync | No Sync |
| 125 Mbps | $5.4 \times 10^{-7}$ | 0 | 0 | 0 | 0 | 0 | 0 | $1.6 \times 10^{-2}$ | No Sync | No Sync | No Sync | No Sync |

No Sync indicates a non-synchronous state.

When the transmission rate was set to 50 Mbps, the error-free state was realized under the conditions of Setting No. 2 through Setting No. 11, and thus data can be transmitted without problem. Under the condition of Setting No. 11, a ratio of the data pulse current HB to the rising pulse current HA (HB/HA) is 5.27 and a ratio of the data pulse current HB to the falling pulse current HC (HB/HC) is 4.21. In addition, under the conditions of Setting No. 2 through Setting No. 10, each of the ratio is 5 or less. For this reason, when the ratio HB/HA of the data pulse current value HB to the rising pulse current value HA and the ratio HB/HC of the data pulse current value HB to the falling pulse current value HC are 5 or less, 50-Mbps transmission is possible.

Further, according to the results in Table 4, even when the transmission is equal to or higher than 75 Mbps, but there is no doubt in the necessity the ratio of the data pulse current value HB to the rising pulse current value HA and the ratio of the data pulse current value HB to the falling pulse current value HC should be 5 or less despite differing in optimum values of driving conditions.

Figure 8A:
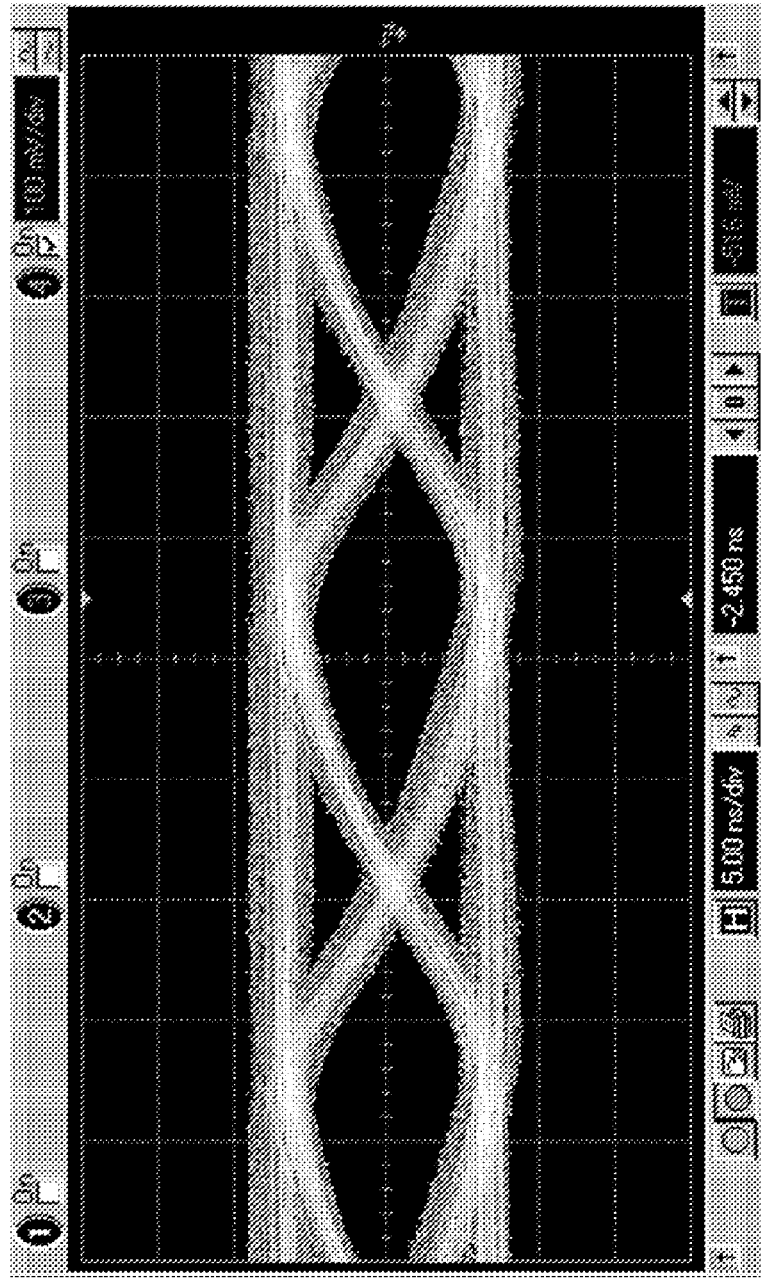
FIGS. 8A and 8B are graphs exemplifying an eye pattern according to the second embodiment of the present invention wherein FIG. 8A exemplifies an error-free eye pattern and FIG. 8B exemplifies an eye pattern during error occurrence.
Figure 8B:
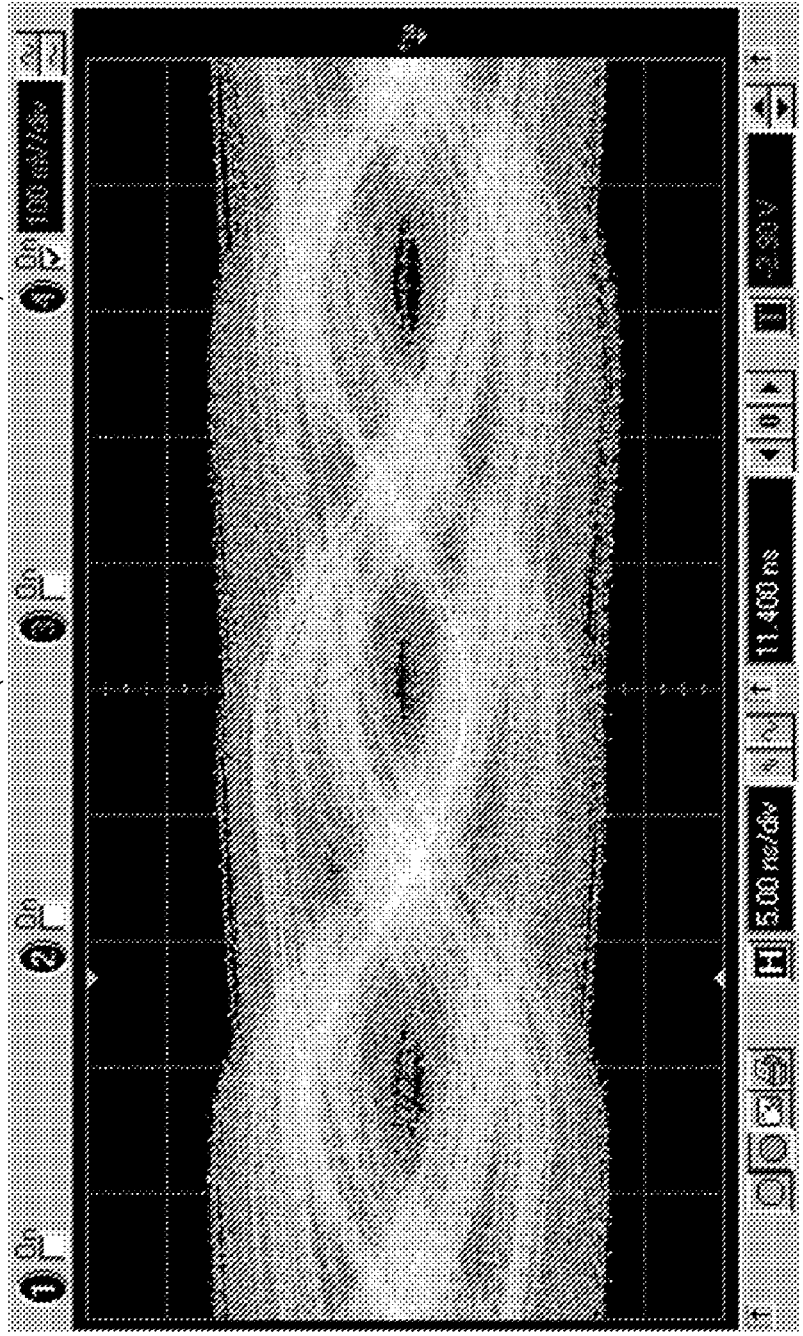

Finally, under the driving conditions of Setting No. 8 through Setting No. 12, results of measuring an eye pattern during 50-Mbps transmission are shown in FIG. 8A and FIG. 8B. Under the driving condition of Setting No. 8 corresponding to the error-free state, a preferable eye pattern was obtained as shown in FIG. 8A. However, under the driving condition of Setting No. 12 under which the bit error rate is degraded to $6.3 \times 10^{-7}$, the interference occurring between codes was observed as shown in FIG. 8B. Thus, it should be noted that the interference between codes is a degrading factor of bit error rates.

Third Embodiment

Next, with reference to FIG. 9 through FIG. 10B, a third embodiment of the present invention will be described. The third embodiment and a subsequent fourth embodiment are same as the first and second embodiments except that a modulation encoder and a modulation decoder are added, respectively.

Figure 9:
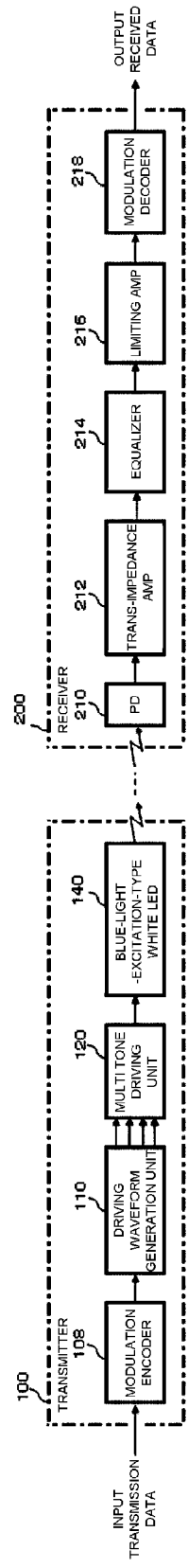
FIG. 9 is a circuit block diagram depicting a configuration of an apparatus according to a third embodiment of the present invention.

FIG. 9 shows a circuit configuration of the third embodiment. The circuit configuration of the third embodiment includes a modulation encoder 108 and a modulation decoder 218 in addition to the circuit configuration of the first embodiment shown in FIG. 1A. Here, by way of example, a case where 8B 10B and 17PP are used as modulation codes in the modulation encoder 108 will be described. The reasons for using those codes are as follows: 1) Since they are DC-free codes, clock reproduction is facilitated on the receiving side and unnecessary flicking that may cause a problem when visible light is used as a carrier can be suppressed. In addition, since a DC component can be removed from the receiving circuit, the influence of unmodulated extraneous light (sunlight) can be suppressed. 2) A width of a minimum pulse necessary for the transmission rate increases compared to the Manchester code as shown in Table 5 below thereby lowering an upper limit of a necessary modulation band. Here, the upper limit of the modulation band is calculated by (1/minimum pulse width)×0.7 which is obtained for experiments.

TABLE 5

| Modulation codes | DC-free | Minimum pulse width (ns) | Maximum frequency of modulation band (MHz) | Bit rate (Mbps) after encoding |
|---|---|---|---|---|
| NRZ | X | 10 | 70 | 100 |
| Manchester | ○ | 5 | 140 | 200 |
| 8B10B | ○ | 8 | 87.5 | 125 |
| 17PP | ○ | 13.3 | 52.5 | 150 |

In general, 17PP is classified as a (1, 7) RLL (run length limited) code. The RLL code is obtained by limiting one of or both of a minimum number (minimum run) of consecutive zeros and a maximum number (maximum run) of consecutive zeros between two ones in a code sequence prior to an NRZI (non-return-to-zero inverted) modulation, wherein a transmission square wave is inverted into a bit of 1. When the minimum run is d and the maximum run is k, the NRZI modulation is expressed as "(d, k) RLL." For example, when an RLL data encoded according to (1, 7)RLL code, the minimum and maximum numbers of consecutive zeros or ones are two and eight, respectively. Also for example, when an RLL code is expressed as (1, 7) RLL, the number of continuous "0"s or "1"s is two, which is the minimum, to eight, which is the maximum. In addition, the encoding rate of 17PP (expressed as m/n where m denotes the length of data bits before encoding and n denotes the length of data bits after the encoding) is 2/3.

Figure 10B:
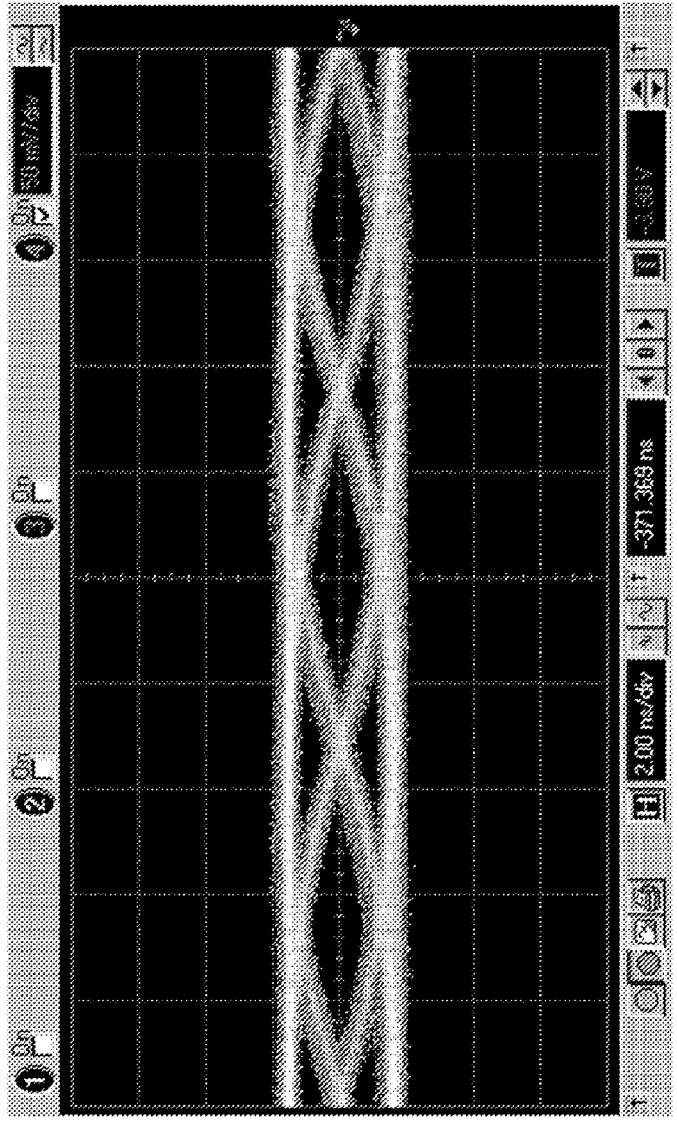

FIG. 10A and FIG. 10B depicts the eye patterns of the output of the equalizer 214 when the data transmission rate is 100 Mbps and 8B10B and 17PP are used as modulation codes are shown in FIG. 10A was obtained using the driving condition of Setting No. 4 of Table 1 and the eye pattern of 17PP shown in FIG. 10B was obtained using the driving condition of Setting No. 3 of Table 1. Regardless of the modulation codes, a favorable eye pattern is obtained and error-free transmission can be implemented. It is a matter of course that the driving condition shown in the first embodiment is satisfied in the error-free state.

Fourth Embodiment

Figure 11:
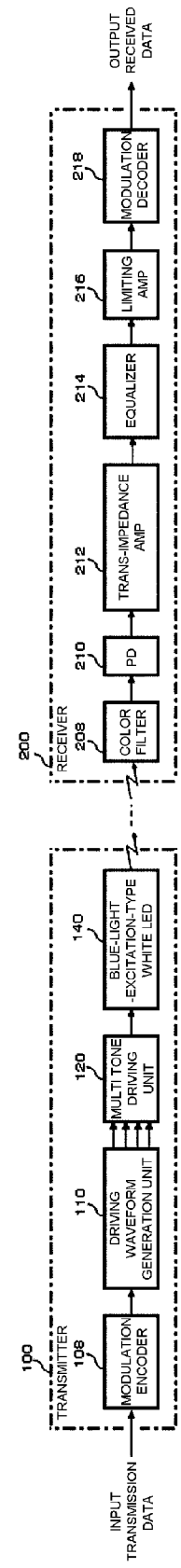
FIG. 11 is a circuit block diagram depicting a configuration of an apparatus according to a fourth embodiment of the present invention.

Next, a fourth embodiment of the present invention will be described with reference to FIG. 11, FIG. 12A and FIG. 12B. FIG. 11 shows a circuit configuration of the fourth embodiment. The circuit configuration of the fourth embodiment includes a modulation encoder 108 and a modulation decoder 218 in addition to the circuit configuration of the second embodiment.

Figure 12A:
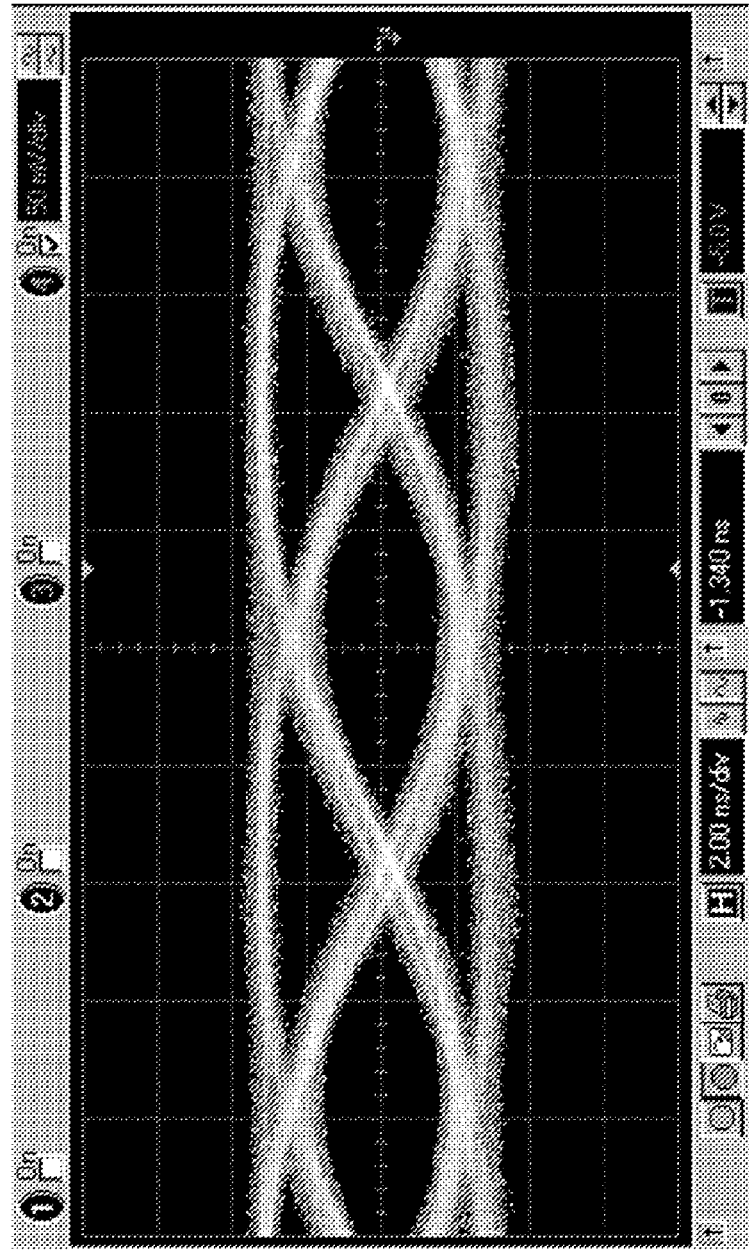
FIGS. 12A and 12B are graphs exemplifying an eye pattern according to the fourth embodiment of the present invention wherein FIG. 12A exemplifies an eye pattern in the case of a modulation code of 8B10B and FIG. 12B exemplifies an eye pattern in the case of a modulation code of 17PP.
Figure 12B:
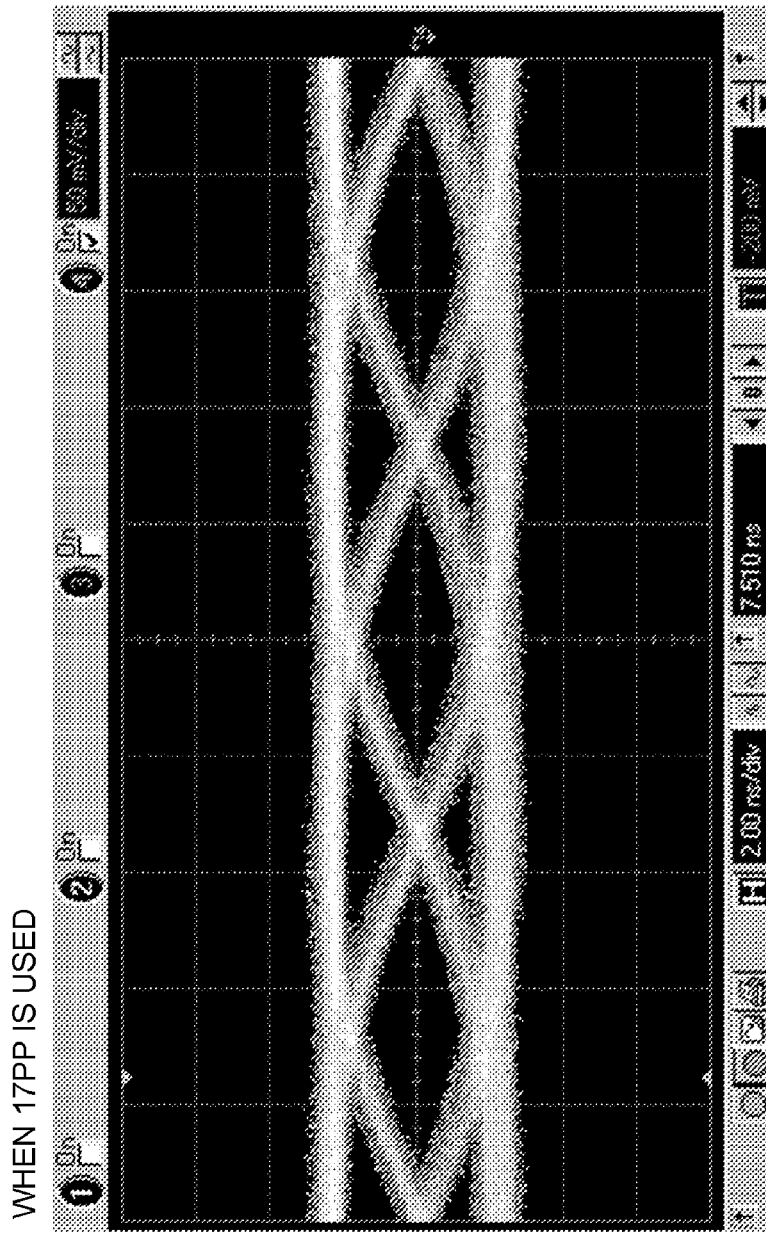
Figure 13A:
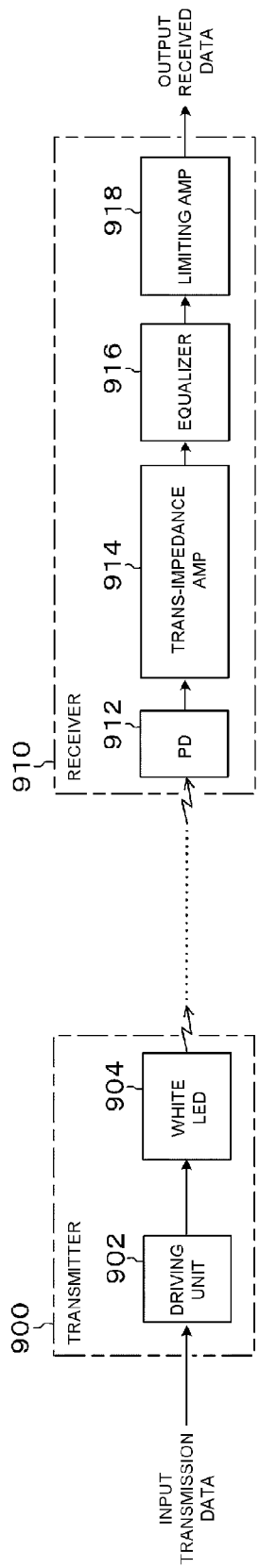
FIGS. 13A to 13C are circuit block diagrams of conventional visible light communication systems.
Figure 13B:
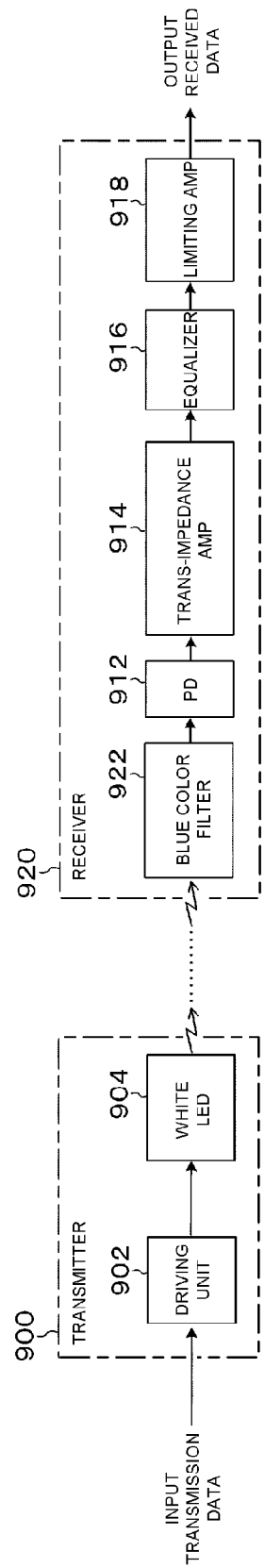
Figure 13C:
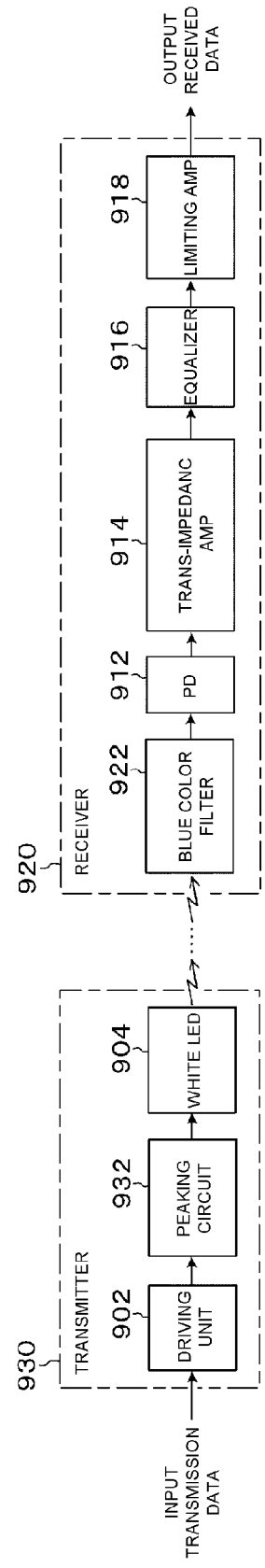

FIG. 12A and FIG. 12B depicts the eye patterns of the output of the equalizer 214 when the data transmission rate is 100 Mbps and 8B10B and 17PP are used as modulation codes are shown in FIG. 12A was obtained using the driving condition of Setting No. 6 of Table 3 and the eye pattern of 17PP shown in FIG. 12B was obtained using the driving condition of Setting No. 5 of Table 3. Regardless of the modulation codes, a favorable eye pattern can be obtained and error-free transmission is implemented. It is a matter of course that the driving condition shown in the second embodiment is satisfied in the error-free state.

In the third and fourth embodiments, 17PP is used as an example modulation code. However, even when codes other than 17PP are used, it is possible to expect the same effects as those of the third and fourth embodiments as long as the codes are DC-free (1, x) RLL codes. Thus, effects of the present invention are not limited to using 17PP as a modulation code.

As described above, the embodiments of the present invention have the following effects:

(1) Since a white LED is multi-tone driven, the at multiple tones, it is possible to favorably and conveniently adjust a pulse height can be adjusted conveniently in a digital manner and destruction of devices caused by an overcurrent exceeding the rated current of the white LED that may occur in a peaking circuit according to an analog configuration can be prevented.

(2) In the case of multi-tone driving, it is easy to obtain an optimum waveform as the minimum resolution of the width if the driving pulse becomes lower. However, a clock that is (unit interval/minimum driving pulse width) times a data clock is necessary. In accordance with the embodiments of the present invention, the pulse widths WA and WC of the rising pulse SA and the falling pulse SC are the same as the unit interval and thus the clock used to generate a multi-tone driving current waveform may have the same frequency as a transmission data clock. For this reason, a visible light communication transmitter according to various embodiments of the present invention can be readily implemented and are superior in terms of cost.

(3) In accordance with the first embodiment and the third embodiment, the receiving side does not use a blue color filter. Thus, the number of components can be reduced resulting in low manufacturing costs.

(4) In accordance with the third embodiment and the fourth embodiment, the DC-free modulation codes are used. As a result:

a) it is possible to suppress unnecessary flicking that may cause a problem when visible light is used as a carrier and b) it is possible to suppress the influence of the unmodulate extraneous light (sunlight) because a DC component can be removed from the receiving circuit.

(5) Since a general-purpose multi-tone laser diode driver IC which is used in optical media systems, can be used, a system can be configured with a low cost.

The present invention is not limited to the above-described embodiments and various changes may be made thereto without departing from the spirit and scope of the present invention. For example, the following are included:

(1) In general, as the blue-light-excited-type white LED 140, the fluorescent material excited by the light of the blue LED emits yellow light complementary to the blue light. However, recent LEDs include a red color component as luminescence components from the fluorescent material to improve color rendering. Such LED is also included in the blue-light-excited-type white LED of the present invention.

(2) The circuit configuration of the driving waveform generator 110 and the multi-tone driver 120 shown in the embodiments is an example and can be various types of known circuit configurations operating in the same way can be employed.

INDUSTRIAL APPLICABILITY

The present invention enables visible light data communication at a sufficient transmission rate using a blue-light-excited-type white LED and thus is preferable for high-speed visible light communication.

What is claimed is:

1. A visible light communication transmitter outputting a visible light signal from a blue-light-excited-type white LED driven by a driving current signal generated based on a transmission data to a receiver, the transmitter comprising:
a multi-tone driver configured to generate the driving current signal of multiple tones by adding a rising square pulse maintained at a high level during a unit interval of the transmission data and a falling square pulse maintained at a low level during the unit interval of the transmission data to a rising edge and a falling edge of the transmission data, respectively.

2. The visible light communication transmitter according to claim 1, wherein a ratio of a current of a data pulse corresponding to the transmission data to a current of the rising square pulse and a ratio of the current of the data pulse to a current of the falling square pulse are equal to or less than 4/5.

3. The visible light communication transmitter according to claim 2, wherein a ratio of the current of the falling square pulse to that of the rising square pulse is 1.0±0.2.

4. The visible light communication system according to claim 1, wherein the high level is independent of the low level.

5. A visible light communication system, comprising:
a visible light communication transmitter configured to output a visible light signal from a blue-light-excited-type white LED driven by a driving current signal generated based on a transmission data to a receiver and including a multi-tone driver configured to generate the driving current signal of multiple tones by adding a rising square pulse maintained at a high level during a unit interval of the transmission data and a falling square pulse maintained at a low level during a unit interval of the transmission data to a rising edge and a falling edge of the transmission data, respectively; and
a visible light communication receiver configured to receive the visible light signal of multiple tones outputted from the visible light communication transmitter and configured to convert the visible light signal of multiple tones received from the transmitter into an electric signal to output a received data.

6. The visible light communication system according to claim 5, wherein a ratio of a current of a data pulse corresponding to the transmission data to a current of the rising square pulse and a ratio of the current of the data pulse to a current of the falling square pulse are equal to or less than 4/5.

7. The visible light communication system according to claim 6, wherein a ratio of the current of the falling square pulse to that of the rising square pulse is 1.0±0.2.

8. The visible light communication system according to claim 5, wherein the visible light communication receiver receives the visible light signal through a color filter, and
a ratio of a current of a data pulse corresponding to the transmission data to a current of the rising square pulse and a ratio of the current of the data pulse to a current of the falling square pulse are equal to or less than 5.

9. The visible light communication system according to claim 8, wherein the visible light communication transmitter further includes a modulation encoder, and
the visible light communication receiver includes a modulation decoder configured to decode a modulation code modulated by the modulation encoder.

10. The visible light communication system according to claim 9, wherein each of the visible light communication transmitter and the visible light communication receiver uses 8B10B as a modulation scheme.

11. The visible light communication system according to claim 9, wherein the visible light communication transmitter and the visible light communication receiver are respectively configured to transmit and receive DC-free RLL encoded and NRZI-modulated data with an encoding rate of 2/3 and a minimum run of 1.

12. The visible light communication system according to claim 5, wherein the visible light communication transmitter further includes a modulation encoder, and the visible light communication receiver includes a modulation decoder configured to decode a modulation code modulated by the modulation encoder.

13. The visible light communication system according to claim 12, wherein each of the visible light communication transmitter and the visible light communication receiver uses 8B10B as a modulation scheme.

14. The visible light communication system according to claim 12, wherein the visible light communication transmitter and the visible light communication receiver are respectively configured to transmit and receive DC-free RLL encoded and NRZI-modulated data with an encoding rate of 2/3 and a minimum run of 1.

15. A visible light communication system, comprising:

a visible light communication transmitter configured to output a visible light signal from a blue-light-excited-type white LED driven by a driving current signal generated based on a transmission data to a receiver and including a multi-tone driver configured to generate the driving current signal of multiple tones by adding a rising pulse and a falling to a rising edge and a falling edge of the transmission data, respectively, each of pulse widths of the rising pulse and the falling pulse being same as a unit interval of the transmission data; and a visible light communication receiver configured to receive the visible light signal of multiple tones outputted from the visible light communication transmitter and configured to convert the visible light signal of multiple tones received from the transmitter into an electric signal to output a received data, wherein the visible light communication transmitter further includes a modulation encoder, and the visible light communication receiver includes a modulation decoder configured to decode a modulation code modulated by the modulation encoder; and wherein the visible light communication transmitter and the visible light communication receiver are respectively configured to transmit and receive DC-free RLL encoded and NRZI-modulated data with an encoding rate of 2/3 and a minimum run of 1.

\* \* \* \* \*